United States Patent [19]

Morrow et al.

[11] Patent Number: 5,033,062
[45] Date of Patent: Jul. 16, 1991

[54] DIGITAL MODEM

[76] Inventors: Stephen E. Morrow, 5089 Cineraria Ct., San Jose, Calif. 95111; Karl F. Osterlund, 6266 Bancroft Way, San Jose, Calif. 95129; Lawrence E. Rosen, 3739 Florence St., Redwood City, Calif. 94063; Philippe Thirion, 85 route de Saint Antoine de Ginestiere- Rac n 3, Nice, France, 06200

[21] Appl. No.: 359,452

[22] Filed: May 30, 1989

[51] Int. Cl.⁵ .......................................... H04L 27/00
[52] U.S. Cl. ...................................... 375/7; 375/117; 379/97
[58] Field of Search ................. 379/93, 97, 98; 375/4, 375/7, 8, 9, 117; 370/48, 49, 85.13, 94.2; 341/50, 126

[56] References Cited

U.S. PATENT DOCUMENTS

| 4,718,082 | 1/1988 | Parker et al. | 379/98 |
| 4,833,706 | 5/1989 | Hughes-Hartog | 379/98 |
| 4,905,273 | 2/1990 | Gordon et al. | 379/93 |
| 4,910,763 | 3/1990 | Caron et al. | 379/98 |
| 4,914,688 | 3/1990 | Kobayashi et al. | 379/97 |

Primary Examiner—Benedict V. Safourek
Attorney, Agent, or Firm—Felsman, Bradley, Gunter & Dillon

[57] ABSTRACT

A digital modem is connected to a CBX in a network. Data is transmitted to the digital modem in a data field of synchronous serial data frames. The digital modem converts the data into a digital signal corresponding to a time sampled analog signal representing the data. The converted digital signal is communicated to a digital to analog converter for transmission on a telephone line. Analog signals received on the telephone line are digitized, and then converted to data in the digital modem.

13 Claims, 3 Drawing Sheets

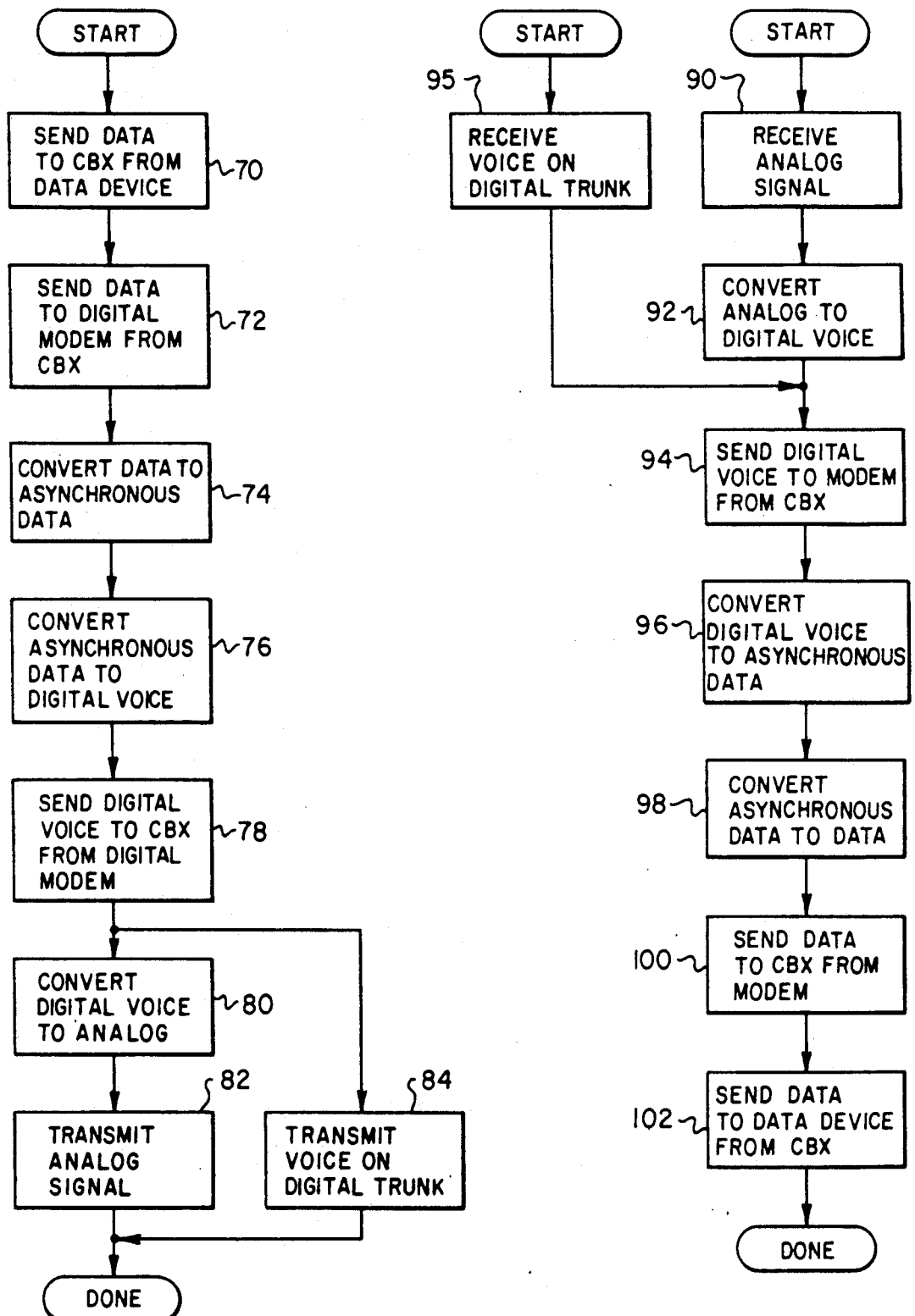

DIGITAL MODEM

BACKGROUND OF THE INVENTION

1. Technical Field

The present invention relates generally to communication systems, and more specifically to encoding of data for transmission over telephone lines.

2. Background Art

Computers and similar electronic equipment are increasingly becoming interconnected through the telephone system. Telephone lines are already in place throughout the industrialized world, and use of these existing lines allows systems to be connected without the expense of installing dedicated cabling. Use of existing phone lines allows computer systems to be connected to a large number of other systems, and worldwide computer networks exist which comprise computer systems interconnected almost entirely by telephone lines originally installed to carry standard spoken communication.

Data cannot be transmitted over public telephone lines directly as digital data. The data must be encoded as analog, audio frequency signals. Received analog signals are converted back into digital data at the receiving end. Devices used for performing these conversions are generally referred to as modems (modulator-demodulator).

Currently available modems support communications rates which vary from approximately 110 bits per second (BPS) to 19,200 BPS. Various standards have been defined for modem communication, including 212A and V.22 bis. These communications rates can be accomplished over typical voice telephone lines. Much higher rates can be reached over dedicated lines which provide a higher bandwidth.

In contrast to devices connected remotely over the telephone network, locally connected devices communicate by direct transfer of digital data. Much higher data transfer rates are available in LANs, with several megabytes per second being typical. One local connection protocol is ROLMlink, manufactured by ROLM. This system allows 256K bps full duplex communications over existing twisted pair telephone wiring. The protocol used by ROLMlink, and the devices required for communication, are described in detail in U.S. Pat. No. 4,642,805, DIGITAL LINK FOR TELEPHONE STATION SETS, which is hereby incorporated by reference herein.

Certain digital switching systems, also known as computerized branch exchanges* (CBX), are often used to route data transfers in a local network. A CBX is also generally attached to outside telephone lines, so that voice and data signals can be transferred between devices attached to the local network and remote devices connected over the telephone network. The CBX is designed to handle digital data, so that normal telephone conversations must be digitized prior to transmission over the local network. *Computerized Branch Exchange is a trademark of ROLM. Many different private branch exchanges (PBX) perform similar switching functions.

In a ROLMlink system, telephone voice signals are digitized in a digital telephone set. The digitized voice signals are then transmitted to a CBX for proper routing. If the destination telephone is attached to the same local network, the digitized voice signals are sent directly to that telephone and converted back to analog form in the receiving digital telephone set. If a telephone call is being made through the public switched telephone network, the digitized voice signals are converted to analog form at the interface to the public network. Such conversion is typically done in a CODEC (coder-decoder).

Communication systems such as ROLMlink are designed for time multiplexed transfer of voice data and other digital data. The other digital data is intended for direct computer to computer communication, and is handled differently from the voice data within the CBX. If it is desired to communicate with a remote computer system over the telephone network, it is necessary to convert such data in the same manner as described above. Such conversion could be done by locating a normal modem at each data device which converts the data to analog form. This analog signal could then be digitized as is done with analog voice signals, and connected to an outside line through the CBX. However, this can be costly, given that many data devices are already directly connected to the local network in order to make use of the independent data channel. The quality of the signal also degrades with the extra digital to analog to digital conversion steps.

It would be desirable for a communication system to provide a means to convert digital data to analog form for transmission over a telephone network. Such conversion should be done in a manner compatible with digital computerized branch exchanges which are designed to handle voice and data communications separately. It would further be desirable for such a system to be able to be attached to existing communications systems.

SUMMARY OF THE INVENTION

It is therefore an object of the present invention to provide a communication system which can convert digital data to an analog signal suitable for communication over a telephone network.

It is another object of the present invention to provide such a communication system which is suitable for efficient operation with a digital computerized branch exchange.

It is a further object of the present invention to provide such a communication system which carries voice and data signals separately.

Therefore, in accordance with the present invention, a digital modem is connected to a computerized branch exchange. Data from data devices connected to the computerized branch exchange is sent to the digital modem. The data is converted to digitally encoded voice data according to a preselected communication protocol, and returned to the computerized branch exchange using the digital voice data channel. From the computerized branch exchange, the digital voice data is sent to a CODEC which is attached to a telephone voice line. Incoming analog signals are digitized, and routed to the digital modem for conversion from digitally encoded voice data to standard digital data, and then routed to the data device through the computerized branch exchange.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 5 is a flowchart illustrating the steps for converting data to an analog signal suitable for communication over a voice telephone network; and FIG. 6 is a flowchart indicating a method for converting received analog signals into data.

DETAILED DESCRIPTION OF THE PREFERRED EMBODIMENT

Figure 1:
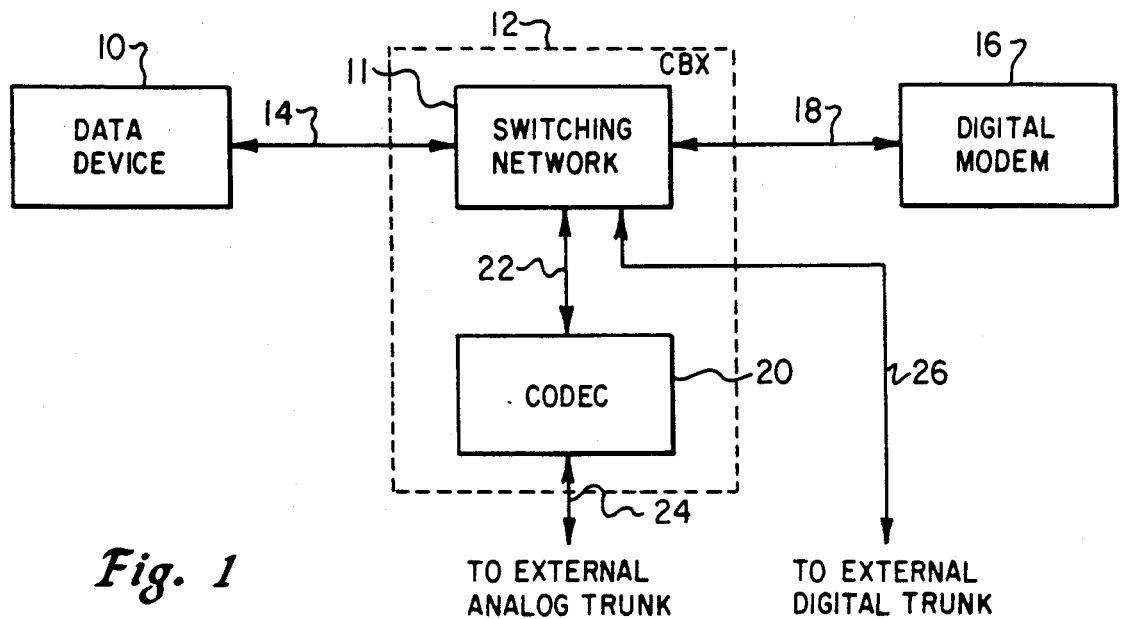
FIG. 1 is a block diagram of a communication system according to the present invention.

Referring to FIG. 1, a data device 10 is connected to a switching network 11 within a computerized branch exchange (CBX) 12 through a communications link 14. A digital modem 16 is connected to the CBX 12 through a communications link 18. A CODEC 20 is contained in the CBX 12 and connected to the switching network 11 through a communications link 22. The CODEC 20 is also connected to an external telephone network line through a communications link 24. The switching network 11 can be connected directly to an external digital trunk through a communications link 26 if access to such a trunk is available.

The data device 10 can be any device which transmits digital data. For example, it can be a stand alone computer system or a video terminal. It can also be a combined voice and data unit, which generates digitized voice signals on a voice channel and data on a data channel.

Communication links 14 and 18 are preferably high speed local network digital links, such as ROLMlink. This communications link is described in detail in the above-cited U.S. Pat. No. 4,642,805. Such preferred communication protocol utilizes a full duplex, synchronous serial link using data frames having a format described in connection with FIG. 2. Communication link 22 can be any link suitable for the transmission of digitized voice data.

Figure 2:
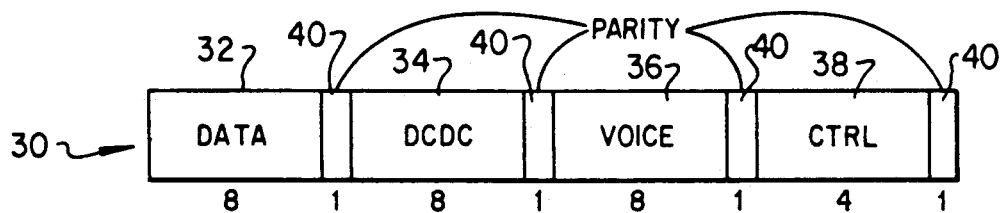
FIG. 2 illustrates the format of a data frame on digital link such as ROLMlink.

In FIG. 2, a frame 30 has two 8 bit data fields 32, 34, an 8 bit voice field 36, and a 4 bit control field 38. A parity bit 40 is associated with each of these fields. The data field 32 contains information sent on the data channel, and the DCDC field 34 contains flow control and clocking information for the data channel. The voice field 36 contains digitized voice data sampled at 8KHz. The voice data is preferably encoded using standard mu255 PCM encoding.

A frame 30 is transmitted each 125 microseconds, giving a total bit transfer rate of 256K bps. At this speed, each 8 bit field transfers data at a 64K bps rate. Communication link 22 should be able to transfer data at 64K bps.

The voice and data fields 36, 32 can be manipulated independently within the CBX 12. They can, of course, be routed to the same destination if a receiving device can handle both data and voice communications. Only digitized voice data can be connected to the CODEC 20 through communications link 22.

The CODEC 20 converts 64K bps encoded voice data received from link 22 to an analog signal suitable for transmission over a telephone network. In the case of spoken voice, the signal transmitted to link 24 is the same as the analog signal originally generated in response to a speaker's voice, within the limits of accuracy imposed by the conversions described above.

Analog data received on link 24 is converted by the CODEC 20 to 64K bps encoded voice data and communicated to the CBX 12 on link 22. This can be done simultaneously with the digital to analog conversion of data received on link 22. The CBX 12 then routes this encoded voice data according to its internal connection table.

When the data device 10 needs to send data contained within the data field 32 to a remote system connected over a telephone network, such data is routed to the digital modem 16 by the CBX 12. As will be described in connection with FIG. 3, the digital modem 16 performs the function of a modem, converting such data to encoded voice data and placing it in voice field 36. This encoded voice data, representative of the original digital data, is then routed to the CODEC 20 by the CBX 12.

Figure 3:
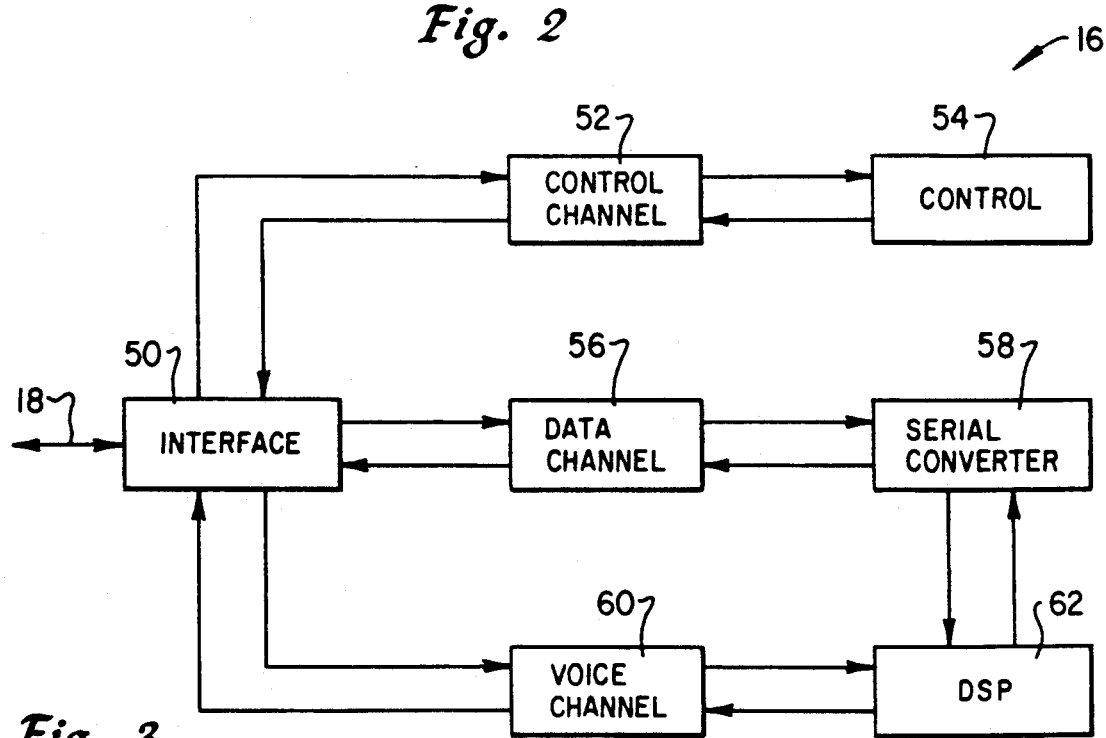
FIG. 3 is a high level block diagram of digital modem functions according to the present invention.

Referring to FIG. 3, a high level functional diagram of a digital modem 16 is shown. An interface unit 50 is connected to the communications link 18, and actually sends and receives the data over communications link 18. The various fields described in connection with FIG. 2 are separately available from the interface unit 50.

A control channel selector 52 is connected to the interface 50, and extracts received information from the control field 38. This information is passed to a control unit 54, which acts on any command sent to the digital modem 16 in the control field 38. The control unit 54 also generates status and event information which is communicated to the control channel selector 52 for inclusion in the control field 38 of frames transmitted to the communications link 18 by the interface 50.

In a similar manner, a data channel selector 56 is connected to the interface 50, and extracts data contained in the data field 32 and the DCDC field 34. This data is communicated to a serial converter 58, the operation of which will be described below. A voice channel selector 60 extracts data communicated in the voice field 36, and communicates it to a digital signal processor 62 which is programmed to perform modem functions on digital signals as described below.

The serial converter 58 receives serial synchronous data from the data and DCDC channels 56 at a rate of 128K BPS. The data is loaded into a shift register, and transmitted to the DSP 62 as an asynchronous signal. The transfer rate to the DSP 62 depends on modem 16 settings previously transmitted in the control field 38, and is typically 1,200, 2,400, or 9,600 BPS according to the previously selected value.

The serial converter 58 also performs asynchronous to synchronous conversion on data received from the DSP 62. When 8 bits of data have been collected by the serial converter 58, they are shifted out at 64K bps to the data channel selector 56 for inclusion in the data field 32 of the next available frame 30.

The DSP 62 receives low speed asynchronous data from the serial converter 58, and generates a synchronous output signal at 64K BPS. This signal is a digital representation of analog data, and is suitable for conversion to analog form by the CODEC 20. The high speed synchronous output is sent to the voice channel selector 60 for inclusion in the voice field 36 of data frames transmitted to the CBX 12 over communications link 18.

The DSP 62 also receives digitized voice data which has been generated by the CODEC 20 and routed to the digital modem 16 by the CBX 12. This data is received as a 64K BPS signal from the voice channel 60, and converted to a low speed asynchronous signal to be communicated to the serial converter 58.

When considered together, the serial converter 58, DSP 62, and CODEC 20 perform a function similar to that performed by a normal, stand alone modem connected to a data line and a telephone line. However, they perform the modem functions using exclusively digital signals. This allows the modem function to be performed in a system routed through a CBX 12 which supports digital transfer of time multiplexed voice and data channels. It also lowers the quantization noise since one less D-A and A-D conversion pair is performed. The signal-to-noise ratio is therefore improved, improving performance of the modem.

Figure 4:
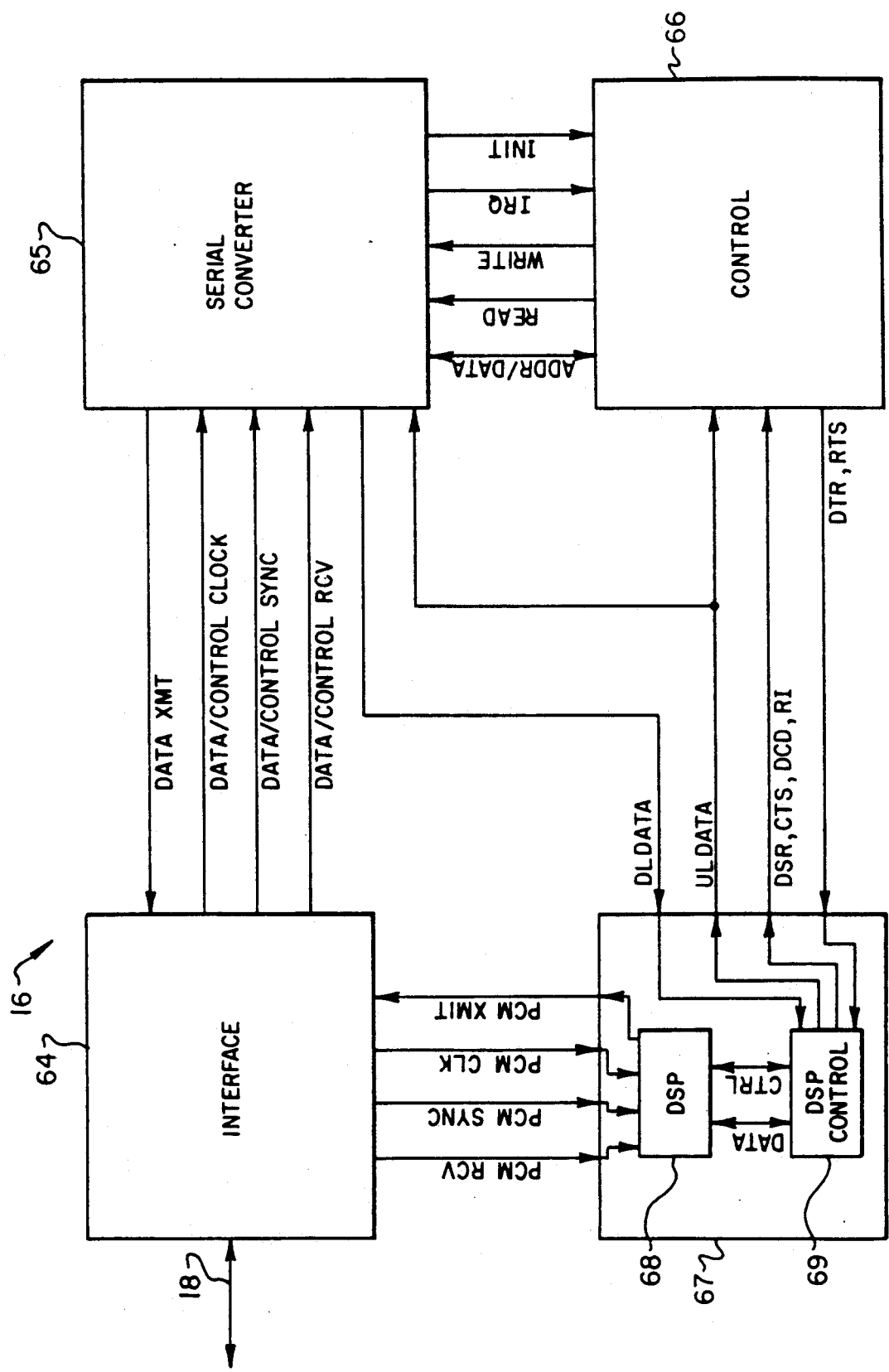
FIG. 4 is a block diagram of a digital modem illustrating control and data signals communicated between subsystems thereof.

Referring to FIG. 4, an implementation of the digital modem 16 which corresponds to the functional diagram of FIG. 3 is shown. An interface 64 is connected to line 18, and also to a serial converter 65. The operation of the serial converter 65 is controlled by a control circuit 66. The interface 64 is also connected to a signal processor 67, which includes a DSP 68 in communication with a DSP control 69. Various data and control signals communicated between these devices are shown.

The interface 64 performs several functions shown in FIG. 3. These are the functions of the interface 50, control channel 52, data channel 56, and voice channel 60. The serial converter 65 and control circuit 66 together perform the same functions as the combination of control circuit 54 and serial converter 58 of FIG. 3. The signal processor 67 corresponds to the DSP 62 of FIG. 3.

Data and control signals received by the interface 64 are transmitted to the serial converter 65 as the signal DATA/CONTROL RCV. This includes the signals in fields 32, 34, and 38 of the frame 30. The signals DATA/CONTROL CLOCK and DATA/CONTROL SYNC provide clocking and frame synchronization signals, respectively, to the serial converter 65. Synchronous data communicated to the interface 64 from the serial converter 65, for inclusion in a frame to be transmitted on line 18, is labelled DATA XMT.

The pulse code modulated digitized voice signals received from the CODEC 20 are communicated from the interface 64 to the signal processor 67 as PCM RCV. The signals PCM SYNC and PCM CLK communicate the corresponding synchronizing and clock signals. The signal PCM XMIT, transmitted from the signal processor 67 to the interface 64, is the 64K bps digitized voice signal corresponding to data transmitted by the data device 10.

The DSP 68 performs all synchronous data transfers with the interface 64. The DSP 68 communicates data and control signals with the DSP control 69. The control 69 interfaces with the serial converter 65 with the signals DLDATA and ULDATA, which represent the data generated by the data device 10 and that received from the CODEC 20, respectively. As described above, the signals are transmitted between the signal processor 67 and the serial converter 65 at the communications rate of standard modems. This rate can be, for example, 1,200, 2,400, or 9,600 bsp.

The DSP control 69 also communicates with the control circuitry 66. The standard modem control signals, including DSR, CTS, DCD, RI, DTR, and RTS, are communicated between the DSP control 69 and control circuitry 66. The status of these signals is used by the DSP control 69 to control the DSP 68.

When a control message is passed to the modem 16 in the control field 38, the serial converter 65 detects the presence of a message and signals the controller 66 by raising an interrupt signal IRQ. The controller 66 can read one or more registers or memory locations in the converter 65 using the address and data lines ADDR/DATA to determine which control signal caused the interrupt. Typical control signals tell the controller 66 to initiate or terminate a call. The controller then signals the signal processor 67 using the standard modem handshaking signals to perform the desired function.

Thus, the serial converter performs several functions. It does the actual bi-directional synchronous-asynchronous conversions. It also signals the presence of a command in the control field 38 and signals to the controller 66 when such occurs.

In systems in which the data link 18 is a ROLMlink, not every frame 30 will contain valid data in the data field 32. This is necessary because of the differences in data rates between the synchronous transmissions and the lower speed asynchronous transmissions. The DCDC field 34 can be used as a flag to indicate which frames 30 contain valid data, and only those data fields 32 corresponding to a valid flag in the DCDC field 34 are used by the converter 65. The remaining data fields 32 are ignored. The serial converter 65 can also use the DCDC field 34 to indicate which frames 30 transmitted to the interface 64 contain valid data.

In one implementation, the DSP 68 can be a TMS320A2400 and the DSP control 69 can be a TMS70A2400. These devices are available from Texas Instruments, and applications notes are available which describe the detailed design for connecting these two devices into a signal processor 67 using the signals described in connection with FIG. 4. The control circuit 66 can be an 8031 general purpose microcontroller available from several companies. External multiplexers can be used as known in the art for address and data decoding. Interface 64 can be the circuitry described in U.S. Pat. No. 4,642,805 or equivalent circuitry which performs the functions described above. Shift registers and associated control circuitry for performing the conversion functions of the serial converter 65 are known in the art.

FIG. 5 describes the method by which data generated by the data device 10 is converted to an analog signal coupled to a telephone network. First, data is sent to the CBX 12 from the data device 70. The CBX 12 has previously been configured to transmit data to the digital modem 16, and transmit voice data received from the modem 16 to the CODEC 20. The CBX sends the data to the modem 72.

Within the digital modem 16, the data is converted to asynchronous data 74 as described in connection with FIGS. 3 and 4. The asynchronous data is converted to encoded voice data 76, and sent from the digital modem 16 to the CBX 78. If the external connection is being made over a standard analog telephone line, CBX 12 routes the voice data received from the digital modem 16 to the CODEC 20, where it is converted from digital data to analog form 80. The resulting analog signal is then transmitted to a telephone network 2. If the external connection is being made to a digital trunk line 26, the CBX 12 routes the digital voice signals directly to such trunk 84.

Referring to FIG. 6, if the external connection is to an external analog line, analog signals received from the telephone network 90 are converted to digital voice signals 92 within the CODEC 20. These encoded digital voice signals are routed to the digital modem 16 from the CBX 94. If the external line is a digital trunk 26, the digitized voice is received directly from the trunk 95 and sent to the modem 94.

Within the digital modem 16, the received voice data is converted to asynchronous data 96 as described in connection with FIG. 3, and converted to synchronous data 98. The converted data is then sent from the digital modem 16 to the CBX 100, which in turn sends the data to the data device 102.

In a preferred embodiment, call connection, including on-hook/off-hook signalling and DTMF dialing is performed by the CBX 12. The digital signal processing capabilities of the modem 16 allow DTMF tones to be generated if desired, so that the CBX 12 may use the digital modem 16 to assist in its call connection functions.

It will be appreciated by those skilled in the art that the system described above results in several important advantages. For a system already having a CBX 12 in place, adding a small number of digital modems 16 requires that only a relatively small amount of equipment be added. As described above, modem performance is improved, resulting in lower error rate communications.

With the system described above, it is not necessary to use a modem connected directly to the data device 10. Such an arrangement would necessitate a digital to analog modem conversion at the data device, followed by an analog to digital conversion to allow the encoded information to be transmitted over the communication link 14. This introduces an extra A-D and D-A conversion pair beyond the above described system.

In the preferred embodiment, two data devices connected to a local area network communicate directly with no analog conversion necessary. If one device is remotely attached to a telephone network, conversion is handled by the digital modem 16 without any change in operation on the part of the data device 10. Thus, the data device 10 needs only a single communication protocol to communicate with both local and remote devices.

Since the digital modem 16 is connected to the CBX 12, it may be shared by all data devices connected to the CBX 12. Since any digital modem 16 can be used by any device connected to the network, fewer such modems are needed and the overall cost of providing data communications over a telephone network is lessened.

While the invention has been particularly shown and described with reference to a preferred embodiment, it will be understood by those skilled in the art that various changes in form and detail may be made therein without departing from the spirit and scope of the invention.

We claim:

1. A communication system, comprising:
   a data device for generating and receiving digital data;
   a digital switch for connecting said data device to one of a plurality of communication lines; and
   a converter connected to said digital switch for converting digital data to a corresponding digital signal representing a time sampled analog signal, and for converting time sampled analog signals to corresponding digital data;
   wherein said switch connects said data device and said converter together, and wherein digital data generated by said data device is converted to a time sampled analog signal in said converter, and wherein time sampled analog signals received by said converter are converted to digital data which is communicated to said data device.

2. The system of claim 1, further comprising:
   a coder-decoder, wherein time sampled analog signals generated by said converter are communicated to said coder-decoder and therein converted to analog signals and coupled to a telephone line, and wherein analog signals received from the telephone line are converted to time sampled analog signals and communicated to said converter.

3. The system of claim 2, wherein said coder-decoder is connected to said digital switch, and wherein time sampled analog signals are communicated between said coder-decoder and said converter through said digital switch.

4. The system of claim 1, wherein digital signals are communicated between said data device, said switch, and said converter as synchronous serial signals having separate voice and data channels.

5. The system of claim 4, wherein said converter comprises:
   first select means for communicating digital signals between itself and the data channel;
   second select means for communicating digital signals between itself and the voice channel; and
   a data converter connected to said first and second select means, wherein said data converter converts data received from said first select means into a corresponding digital signal representing a time sampled analog signal and communicates such corresponding signal to said second select means, and wherein said data converter converts time sampled analog signals received from said second select means into corresponding digital data and communicates such corresponding data to said first select means.

6. The system of claim 5, further comprising:
   a serial converter connected between said first select means and said data converter, wherein data is communicated between said first select means and said serial converter as synchronous serial data, and wherein data is communicated between said serial converter and said data converter as asynchronous serial data.

7. A digital modem, comprising:
   an interface for bidirectional communication over an external communications line of synchronous serial data in frames each having a first field and a second field;
   a serial converter connected to said interface for converting data received from said interface and contained in the first field into asynchronous serial data, and for converting asynchronous serial data into synchronous serial data to be placed into the first field for communication to said interface;

a data converter connected to said interface and said serial converter, wherein said data converter receives asynchronous serial data from said serial converter and generates a corresponding digital signal representing a time sampled analog signal to be communicated to said interface and therein placed into the second field, and wherein said data converter receives digital signals from said interface and converts data in the second field into asynchronous serial data for communication to said serial converter.

8. The digital modem of claim 7, further comprising:
a controller connected to said interface for communicating using a third field of the synchronous data frames, wherein instructions for the digital modem are communicated to said controller in the third field, and wherein said controller controls operation of the digital modem according to the instructions.

9. The digital modem of claim 7, wherein asynchronous serial data is transferred between said serial converter and said data converter at a rate corresponding to a data transfer rate suitable for analog data transfer on a telephone line.

10. The digital modem of claim 7, wherein the sampled analog signals communicated in the second field are encoded as mu-law pulse code modulated signals.

11. A method for communicating information between a data device and an analog communications line, comprising the steps of:
(a) communicating digital data between the data device and a digital switch;
(b) communicating digital data between the digital switch and a converter;
(c) communicating time sampled analog signals between the digital switch and the converter;
(d) within the converter, converting digital data received from the digital switch to time sampled analog signals for communication to the digital switch;
(e) within the converter, converting time sampled analog signals received from the digital switch to digital data signals for communication to the digital switch;
(f) converting time sampled analog signals generated by the converter into analog signals;
(g) communicating the analog signals of step (f) to an analog communications line;
(h) receiving analog signals from the analog communications line; and
(i) converting the analog signals of step (h) into time sampled analog signals for communication to the digital switch.

12. The method of claim 11, wherein the digital data and time sampled analog signals are communicated between the converter and the digital switch using synchronous serial data transfer with data frames having separate fields for digital data and the sampled analog signals.

13. A method of converting data, comprising the steps of:
(a) receiving synchronous serial data in received data frames having a data field;
(b) converting such synchronous serial data to asynchronous serial data;
(c) converting such asynchronous serial data to corresponding synchronous serial data representing time sampled analog data;
(d) transmitting the synchronous data of step (c) in transmitted data frames having a sampled data field;
(e) receiving time sampled analog data in a sampled data field of received data frames;
(f) converting the time sampled analog data of step (e) into asynchronous serial data;
(g) converting the asynchronous serial data of step (f) into synchronous serial data; and
(h) transmitting the synchronous serial data of step (g) in a data field of the transmitted data frames.

* * * * *